United States Patent
Rigazio et al.

(10) Patent No.: US 6,182,039 B1
(45) Date of Patent: *Jan. 30, 2001

(54) METHOD AND APPARATUS USING PROBABILISTIC LANGUAGE MODEL BASED ON CONFUSABLE SETS FOR SPEECH RECOGNITION

(75) Inventors: Luca Rigazio; Jean-Claude Junqua; Michael Galler, all of Santa Barbara, CA (US)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/047,274

(22) Filed: Mar. 24, 1998

(51) Int. Cl.$^7$ .................................................. G10L 15/04
(52) U.S. Cl. ...................... 704/257; 704/251; 704/252; 704/239
(58) Field of Search .................................. 704/239, 238, 704/242, 243, 247, 251, 252, 257

(56) References Cited

U.S. PATENT DOCUMENTS

| | | | | |
|---|---|---|---|---|
| 4,674,065 | * | 6/1987 | Lange et al. ......................... | 382/311 |
| 5,606,644 | * | 2/1997 | Chou et al. ........................... | 704/243 |
| 5,737,723 | * | 4/1998 | Riley et al. ........................... | 704/243 |
| 5,839,106 | * | 11/1998 | Bellegarda ........................... | 704/257 |

FOREIGN PATENT DOCUMENTS 0 313 975  *  5/1989  (EP) ............................... G10L/5/06

OTHER PUBLICATIONS

Bahl et al. (Constructing Groups of Acoustically Confusable Words), IBM Research Division, p. 85–88, 1990.*

Loizou, Philipos, (High–Performance Alphabet Recognition), IEEE Transactions on speech and Audio Processing, vol. 4, No. 6, p. 430–445, 1996.*

* cited by examiner

*Primary Examiner*—David R. Hudspeth
*Assistant Examiner*—Abul K. Azad
(74) *Attorney, Agent, or Firm*—Harness, Dickey & Pierce, P.L.C.

(57) ABSTRACT

The speech recognizer incorporates a language model that reduces the number of acoustic pattern matching sequences that must be performed by the recognizer. The language model is based on knowledge of a pre-defined set of syntactically defined content and includes a data structure that organizes the content according to acoustic confusability. A spelled name recognition system based on the recognizer employs a language model based on classes of letters that the recognizer frequently confuses for one another. The language model data structure is optionally an N-gram data structure, a tree data structure, or an incrementally configured network that is built during a training sequence. The incrementally configured network has nodes that are selected based on acoustic distance from a predetermined lexicon.

16 Claims, 9 Drawing Sheets

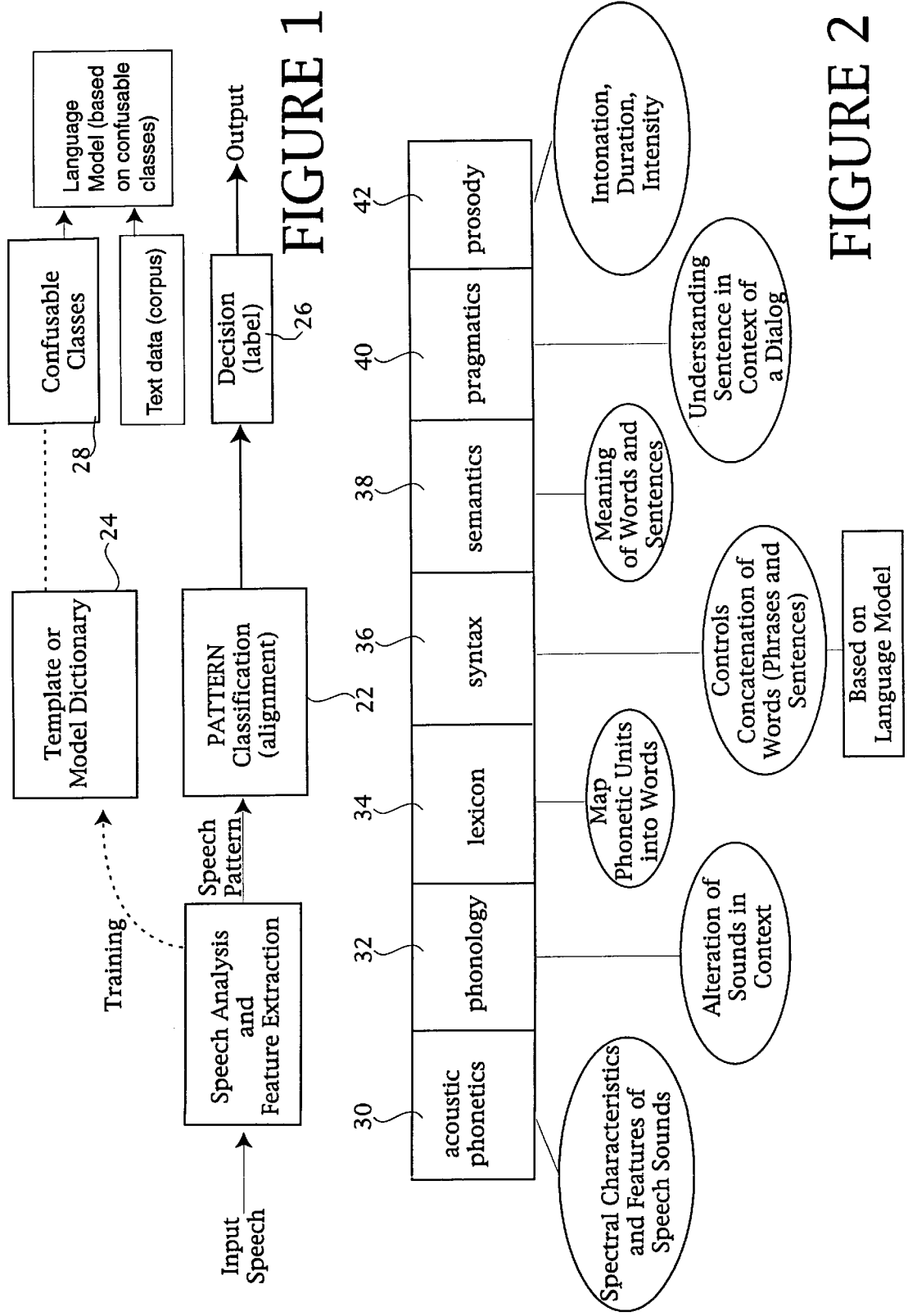

METHOD AND APPARATUS USING PROBABILISTIC LANGUAGE MODEL BASED ON CONFUSABLE SETS FOR SPEECH RECOGNITION

BACKGROUND AND SUMMARY OF THE INVENTION

The present invention relates generally to speech recognition systems. More particularly, the invention relates to a speech recognition system that incorporates a language model that organizes syntactic content according to acoustic confusability.

Speech recognition involves acoustic pattern matching between the input speech and a previously trained acoustic model. Typically the model employs a large number of parameters and hence a great deal of processing time is usually expended during the pattern matching phase of the recognition process.

To address the high computational burden, some is recognition systems endeavor to constrain the search space (i.e., consider fewer than all possible pattern matching nodes) based on natural language constraints. In other words, a priori knowledge of the natural language (e.g. English, Japanese, French, Italian) can be used to assist the recognizer in identifying the most probable word candidates. Language models can thus be used as a source of information in speech recognition, to limit the number of acoustic pattern matching sequences that are actually considered during the recognition process. The goal of the language model is to predict words in a given context.

Syntactic models rely on a formal grammar of the language. In such models, syntactic sentence structure are defined by rules that can represent global constraints on word sequences. Statistical models, or stochastic models, use a different approach. Stochastic models provide a probability distribution for a set of suitably defined contexts. The probability distribution depends on the training data available and on how the context has been defined.

Both approaches have their strengths and weaknesses. Syntactic models enforce strong syntactic and grammatical constraints, but they are very difficult to extend to spontaneous speech and natural language. Stochastic models are generally better able to handle spontaneous speech and natural language, however they do not always exclude word strings that make no sense in the natural language.

To further enhance recognition accuracy, some recognition systems apply a priori knowledge of the source content within the lexicon matching phase. Typically, the lexicon matching phase is performed after the recognizer has extracted features from the acoustic information of the input signal using acoustic pattern matching. This lexicon matching phase, in effect, classifies the speech patterns resulting from feature extraction, matching those patterns to entries in the lexicon or dictionary. Dynamic programing algorithms are frequently used in this phase.

While the above-described techniques work well in many applications, there are some particularly difficult speech recognition problems that are not adequately addressed by existing technology. One such problem is the letter recognition problem encountered when attempting to recognize spelled words or names. Spoken letter recognition is difficult, because many letters sound nearly the same, particularly when transmitted through a low quality audio channel, such as currently found in telephone equipment. Anyone who has attempted to spell a name to another person through the telephone will appreciate the difficulty. Where audio transmission quality is lacking, many letters are confusable with one another.

Applying conventional technology, it has been proposed that the dictionary or lexicon (containing all spelled names recognized by the system) also be encoded with knowledge of confusable letters. To do this, the dictionary is augmented with additional entries, representing the original entries, but spelled using confusable letter substitutions. While this technique will work in some cases, it is not without several significant drawbacks. First, adding additional entries to the dictionary corresponding to all possible permutations of letter substitutions, greatly increases the size of the dictionary and thus greatly increases the computational burden. Second, by including all possible substitution permutations, some ambiguities can arise where a given string of letters can map to several different entries in the dictionary.

The present invention takes a different approach. Instead of applying knowledge of confusability in the lexicon or dictionary, the invention injects knowledge of confusability directly into the language model used by the recognizer to limit the number of sequences that are considered at the acoustic level. In other words, knowledge of inherent confusability is embedded into the recognizer itself, where the knowledge is exploited to achieve higher efficiency. Thus confusability is taken into account prior to the lexicon matching phase.

The invention is described herein in the context of a spelled name letter recognizer, inasmuch as the spelled name application presents a good opportunity to exploit inherent confusability. Of course, the principles of the invention are not limited to letter recognition or spelled name recognition. In general, the invention can be used in any speech recognition system for analyzing input speech that corresponds to a pre-defined set of syntactically defined content. In the case of spelled name recognition, the syntactically defined content represents those defined sequences of letters representing names in the dictionary. In a more general application speech recognizer, the syntactically defined content might represent the general concatenation of phonemes, words, phrases and sentences which are grammatically correct according to the particular language model.

A speech recognizer system constructed in accordance with the invention includes a speech recognizer that performs a recognition process on input speech by considering a plurality of acoustic pattern matching sequences. A language model, associated with the recognizer, constrains the number of sequences considered by the recognizer during the recognition process. The language model is based on knowledge of the pre-defined set of syntactically defined content, and includes a data structure that organizes the content according to acoustic confusability. The data structure can take many forms, including an N-gram data structure, a tree data structure, or an interactively configured network having nodes selected based on acoustic distance from a pre-determined lexicon.

For a more complete understanding of the invention, its objects and advantages, refer to the remaining specification and to the accompanying drawings.

BRIEF DESCRIPTION OF THE DRAWINGS

FIG. 1 is a block diagram of a basic speech recognizer, useful in understanding the principles of the invention;

FIG. 2 is a block diagram illustrating various representational levels of speech in which knowledge is incorporated;

DESCRIPTION OF THE PREFERRED EMBODIMENT

Figure 3:
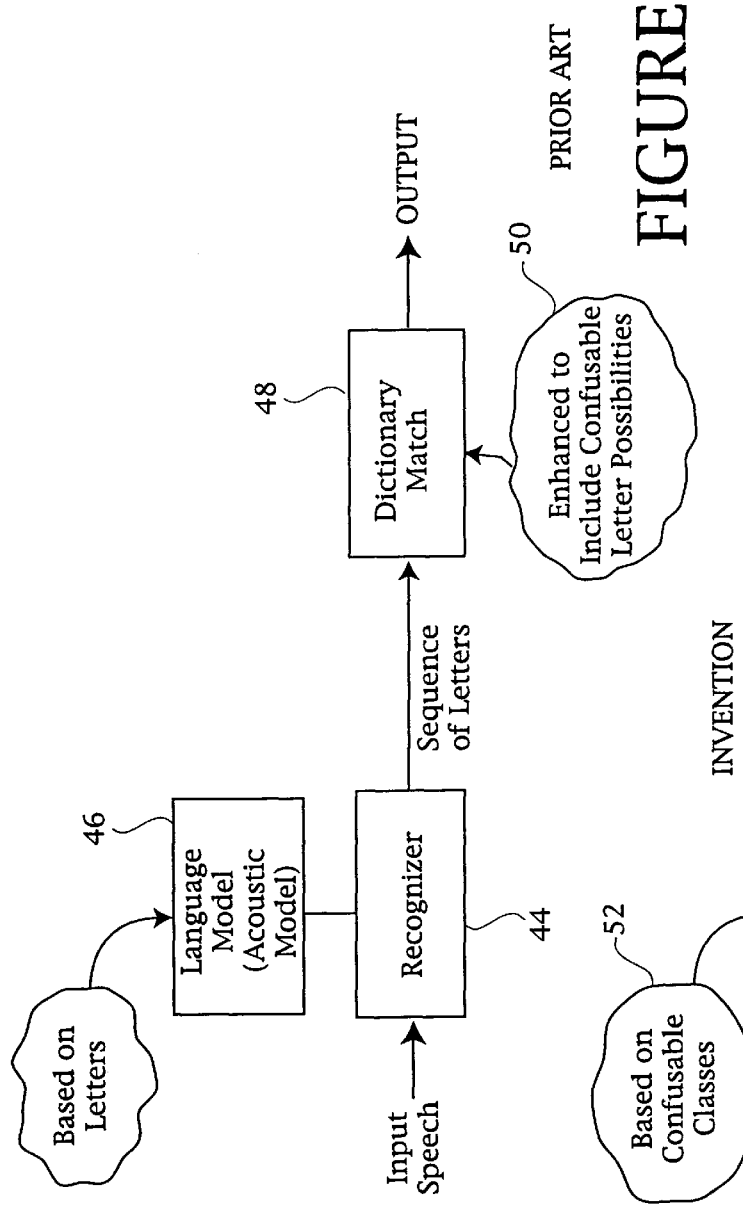
FIG. 3 is a simplified block diagram illustrating a prior art speech recognition technique.

Automated speech recognition is a complex acoustic pattern matching problem. Currently, most speech recognizers attack this problem by defining a model of pre-defined features to represent different speech sounds constituting the vocabulary of the system. During a training phase the system learns the reference patterns representing those different speech sounds, based on spoken examples of known speech. Thereafter, during the recognition process an input pattern is identified during the recognition phase by considering the set of reference patterns stored during training.

FIG. 1 illustrates an exemplary recognizer into which the invention can be incorporated, as will be described. The input speech is supplied to the speech analysis and feature extraction block 20 that extracts the pre-defined set of parameters using a suitable signal analysis method. The extracted speech patterns are then supplied to the pattern classifier block 22 that performs the alignment or matching between the extracted features of the input speech and the previously extracted features obtained during the training phase. The previously extracted features are typically stored in a template or model dictionary 24. The pattern classifier measures the closeness between feature vectors and implements a suitable method for aligning the input and trained model speech patterns, which may differ in duration and rate of speaking.

Finally, the decision block 26 assigns to the unknown pattern a label corresponding to the closest match with the reference patterns of the trained model.

The present invention improves the recognizer's ability to discriminate between words within the language that are very similar in sound. This is accomplished, as will be more fully explained below, by constructing the language model (stored in dictionary 24) using a pre-defined set of confusable classes 28. These confusable classes embody knowledge of the recognizer's inherent inability to discriminate between similar sounds. Thus the invention, through the use of these confusable classes, embeds knowledge of inherent confusability directly into the language model. As will be more fully explained below, placing knowledge of confusability in the language model helps allow the recognizer to operate more quickly and more accurately by constraining the search space covered by the pattern classifier 22 and to save memory. The invention thus achieves a desirably high degree of constraint, but uses a significantly smaller data structure requiring far less computational burden.

To understand the more subtle aspects of the invention, an understanding of how human speech conveys information may be helpful. Although there are many levels at which human speech can be analyzed, FIG. 2 shows one speech model that focuses on the different levels at which information is encoded into human speech. The model is generally a hierarchial one, illustrated from low level (left) to high level (right) in FIG. 2.

Beginning at the left, the acoustic phonetics level relates to the spectral characteristics and features of speech sounds. Elementary sound units at this level are based on acoustic measurements. Next is the phonology layer 32 that corresponds to alteration of sounds in context due to various phenomena, including co-articulation, assimilation, liaisons, and so forth. In layman's terms, the elementary sounds recognized at the acoustic phonetic level are frequently altered somewhat when spoken together as part of a word or phrase. Next, the lexicon level 34 defines how sequences of phonetic units are mapped into words. Thus, at the lexicon level words may be produced from the phonetic sounds established by the lower levels 30 and 32. At the lexicon level, however, there is no knowledge about how these words can be combined to form phrases or sentences.

The syntax level 36 is where phrases and sentences are formed. The syntax level controls concatenation of words, phrases and sentences according to what is grammatically correct according to the particular language model. Syntax considers the surface structure of the language and determines what concatenation of words is legal in the language. The semantics layer 38 relates to the meaning of words and sentences, after having been concatenated according to rules of the syntax layer 36. The semantics layer accords meaning based on the way the words are most commonly used. Semantics deals with the content of a message, sometimes called the deep structure of the message. The semantics level can exclude meaningless sentences that are otherwise grammatically correct according to the syntax level.

The remaining two levels represent still higher and abstract forms of knowledge representation. The pragmatics level 40 concerns the meaning of a sentence within a particular context, such as that of a task or a dialog. Whereas semantics accords a sentence its ordinary meaning, pragmatics allow different meanings, depending on the context. Finally, the prosody level 42 is involved with prosodic features, such as intonation, duration, and intensity of speech. Prosodic features can play an important role at different levels of the recognition and understanding hierarchy. To a large extent prosody is language specific.

Past attempts at improving the recognizer's discrimination among confusingly similar sounds have focused upon the acoustic level 30 and the syntax level 36. At the syntactic level, the erroneous substitution of a confusingly similar sounding word can sometimes be trapped by the syntax rules for word concatenation. For example, in the following two sentences, the acoustic confusability between the words "ate" and "eight" can be discriminated at the syntactic level:

John ate lunch.

John eight lunch.

Similarly, the syntactic level would be able to discriminate between confusably similar words that do not have the identical pronunciation:

John ate lunch.

John nape lunch.

Of course, the syntactic level does not detect all confusable word substitutions. It only traps those that will form grammatically incorrect phrases or sentences.

In the context of a general purpose speech recognizer, designed to recognize words, phrases and sentences spoken as natural, conversational speech, word confusability can often be adequately handled at the syntactic level. However, certain classes of recognition problems, such as spelled name recognition, are not well handled at the syntactic level.

For the purpose of the language model in a spelled named recognizer, the individual spoken letters are analogous to "words" of the general purpose recognizer, and the concatenation of those letters to spell a particular name corresponds to "sentences" within the general purpose recognizer context. In other words, the syntactic level of a spelled name recognizer is involved with the concatenation rules by which individual letters may be combined to spell individual names. To illustrate, the recognizer would treat the following speech input as a "sentence" of five "words":

J . . . O . . . N . . . E . . . S

To further illustrate, FIG. 3 shows how a conventional recognizer adapted for spelled name recognition would deal with the problem of confusable letters. The recognizer 44 employs a language model 46 that is defined based upon all letters of the alphabet (e.g. 26 letters for the English language). The recognizer outputs a sequence or string of letters to the dictionary matching module 48. The dictionary matching module enforces the syntactic rules. It thus discriminates between letter string sequences that are syntactically correct (i.e. that spell names defined by the system) and those that are not. As illustrated diagrammatically at 50, the dictionary matching data structure can be enhanced to include possible confusable letter substitutions, allowing the dictionary to identify a valid name even if one or more of the letters has been replaced by a confusing similarity. Of course, this approach would either greatly increase the size of the dictionary needed to represent the "syntactically correct" names in their various permutations of misspellings or require a postprocessing phase.

Figure 4:
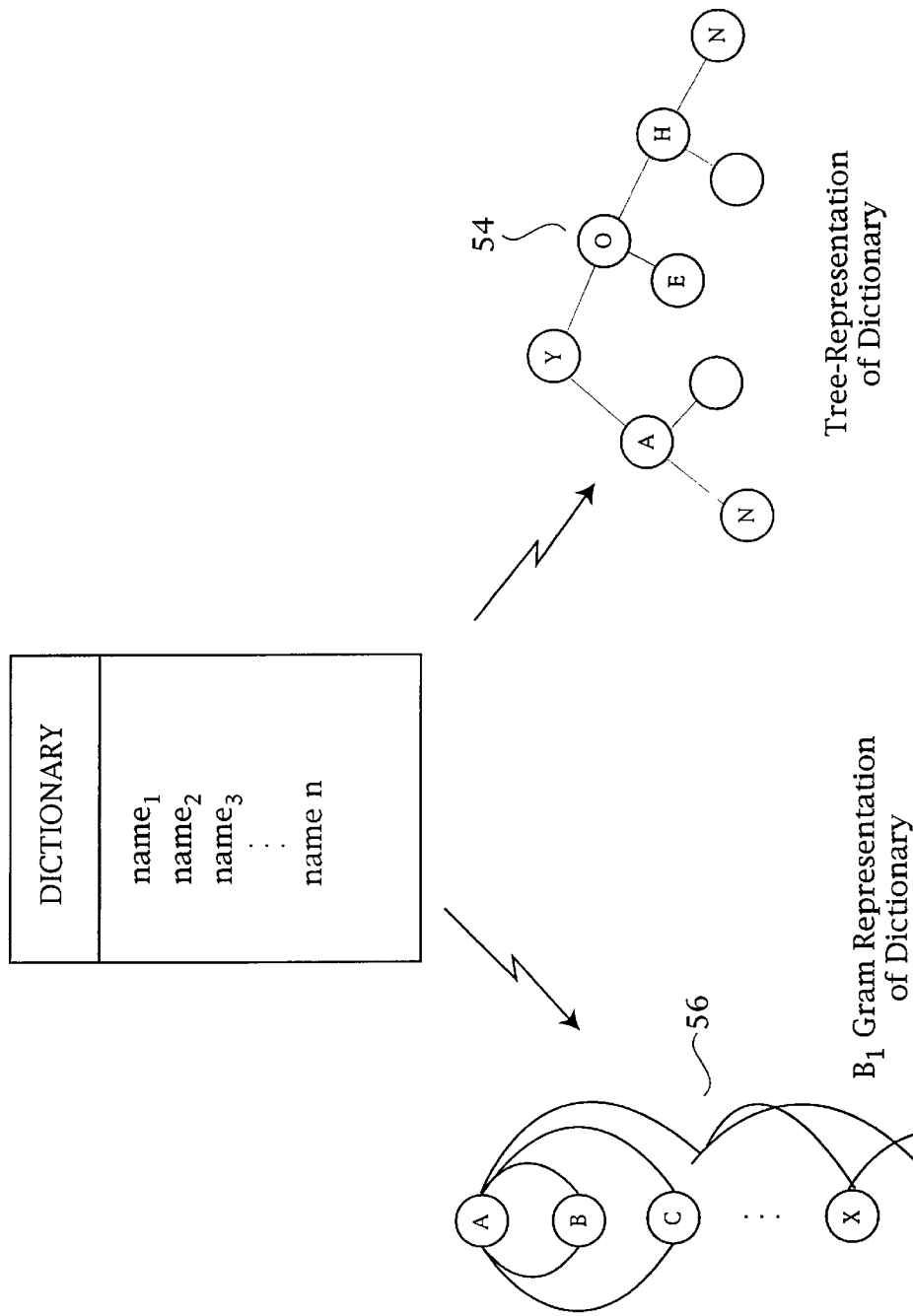
FIG. 4 illustrates different directed graph (network) data structures for representing words or names in a dictionary.

The dictionary matching module 48 can store dictionary entries in a variety of data structures. FIG. 4 illustrates two possible alternatives, the tree representation, shown at 54 and the bigram representation shown at 56. The tree representation 54 assigns to each node one letter in a spelled name sequence. The spelled name is generated by traversing the tree in top-down fashion until a terminal node is reached.

The bigram data structure 56 employs one node for each letter in the alphabet. A sequence of letters representing a spelled name is generated by traversing from one node to the other, following the connecting lines provided, until the spelled name is generated. Unlike the tree structure, the bigram data structure has no inherent way of representing a terminal node. In other words, there is no built-in mechanism for determining when the last letter of a spelled name has been reached. Similarly, the bigram data structure is able to generate sequences of letters that are not found in the dictionary. The bigram is one form of the more general purpose N-gram data structure, where N is an integer number representing the number of letters assigned to each node. Trigrams and quadigrams are examples of N-gram data structures of higher order.

Figure 5:
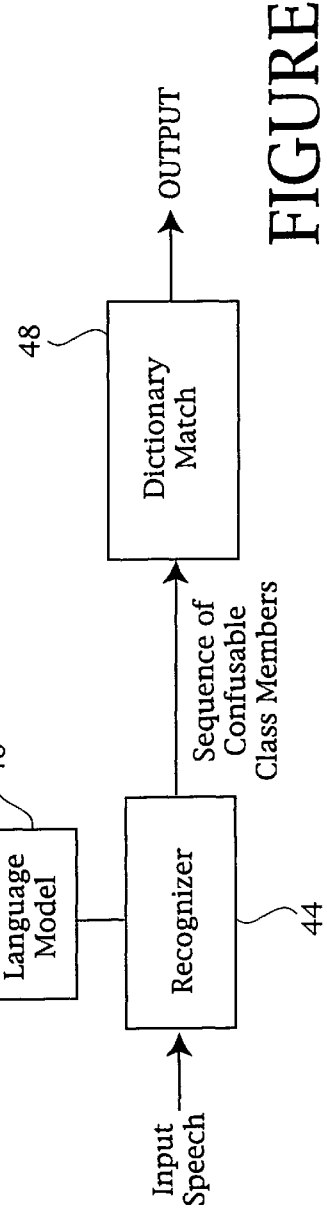
FIG. 5 is a block diagram illustrating the principles of the invention.

In contrast to the conventional approach, the present invention incorporates knowledge of confusability into the language model that is used by the recognizer. FIG. 5 illustrates this diagrammatically. Recognizer 44 employs a language model 46 that is based on confusable classes as diagrammatically indicated at 52. The confusable classes correspond to sets of letters having sounds that the recognizer conventionally has difficulty discriminating among. The presently preferred embodiment employs six classes designated: A Set, E Set, F Set, I Set, M Set and U Set. Unlike the conventional system illustrated in FIG. 3, the recognizer of the invention outputs a sequence of confusable class members that the dictionary matching module interprets according to the confusable classes.

Figure 6:
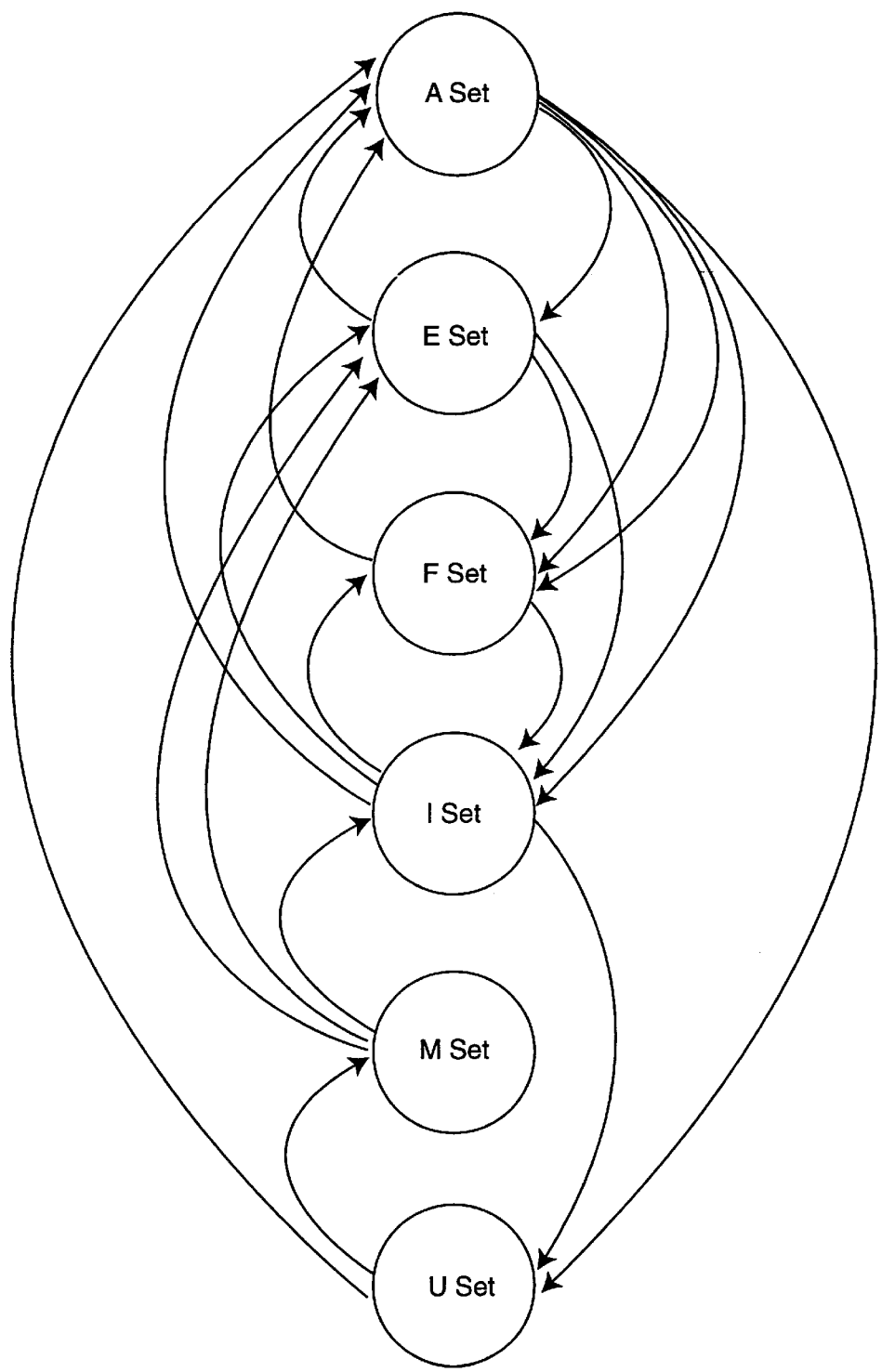
FIG. 6 is directed graph (network) data structure based on confusable classes in accordance with the invention.

The language model 46 (FIG. 5) of the invention can be represented using a variety of different data structures, including the N-gram data structure and the tree structure. To illustrate the principles of the invention, a bigram data structure (N-gram) is illustrated in FIG. 6. Each of the nodes corresponds to a different one of the confusable letter classes. These classes are defined according to results obtained from the particular recognizer being used. The presently preferred embodiment defines six classes of confusable sets with the following membership:

Confusable Sets

A-Set: a, h, j, k
E-Set: b, c, d, e, g, p, t, v, z
F-Set: f, s, x
I-Set: I, y, r
M-Set: l, m, n, o
U-Set: u, q, w

Examining the above confusable sets, some of the confusable letters are the same ones that a human might have difficulty recognizing without confusion over a moderately poor audio channel. However, other letters (e.g., letters l, m and o of the M-Set) may seem unlikely to be confused by humans over a moderately poor audio channel. It should be kept in mind that these confusable sets are defined by letters that the recognizer, not the human, finds confusable. Thus confusable set definition is recognizer-dependent, and the sets illustrated here are those of the current embodiment and are not intended as a limitation of the invention in its broader aspects. In FIG. 6 some of the connecting lines have been omitted between nodes. This has been done merely to simplify the drawing.

Figure 7:
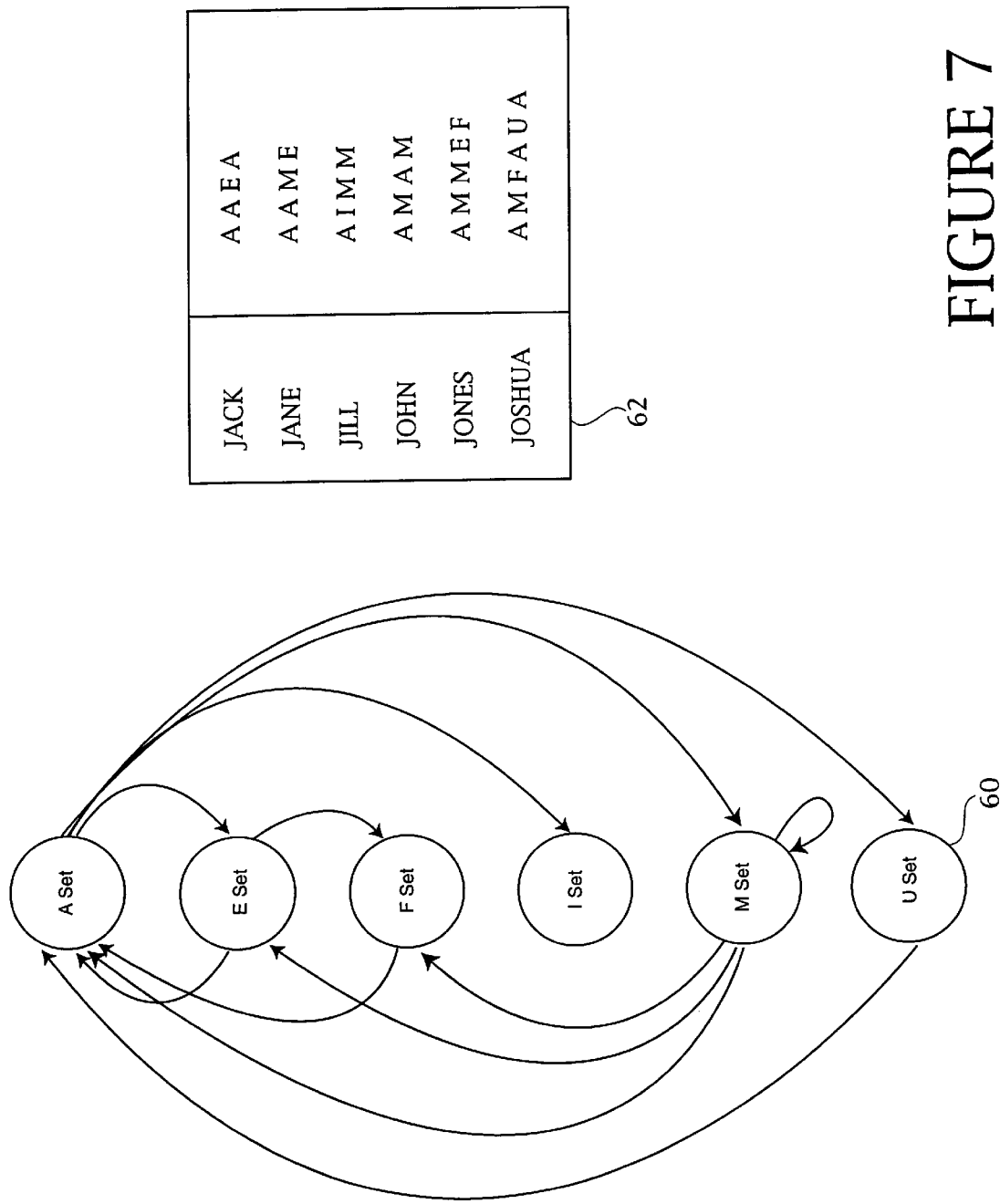
FIG. 7 illustrates the directed graph data structure of FIG. 7 after training upon an exemplary dictionary of six names, wherein the directed graph is a bigram (N-gram) based on six confusable classes.

In the actual embodiment nodes are connected to one another based on what the dictionary of names actually contains. FIG. 7 illustrates this.

Referring to FIG. 7, the bigram data structure 60 has been configured with connecting lines to correspond to the six names entered into dictionary 62. Dictionary 62 serves as a lookup table to relate each name with its corresponding "spelling" using the confusable is sets identified in the confusable sets table above. For example, note that the translation converts the spelled name JACK into the string MEA. Similarly, the spelled name JANE translates to MME.

Use of confusable sets, as illustrated in FIG. 7, results in a potentially significant reduction in the size of the data structure needed to represent the dictionary of names. To better understand this, compare the data structure of FIG. 7 with the bigram data structure 64 of FIG. 8. The data structure of FIG. 8 corresponds to the same six dictionary entries (dictionary 62) as in FIG. 7. Also, for completeness, the corresponding tree structure 66 for those same six names has also been illustrated in FIG. 8.

Figure 8:
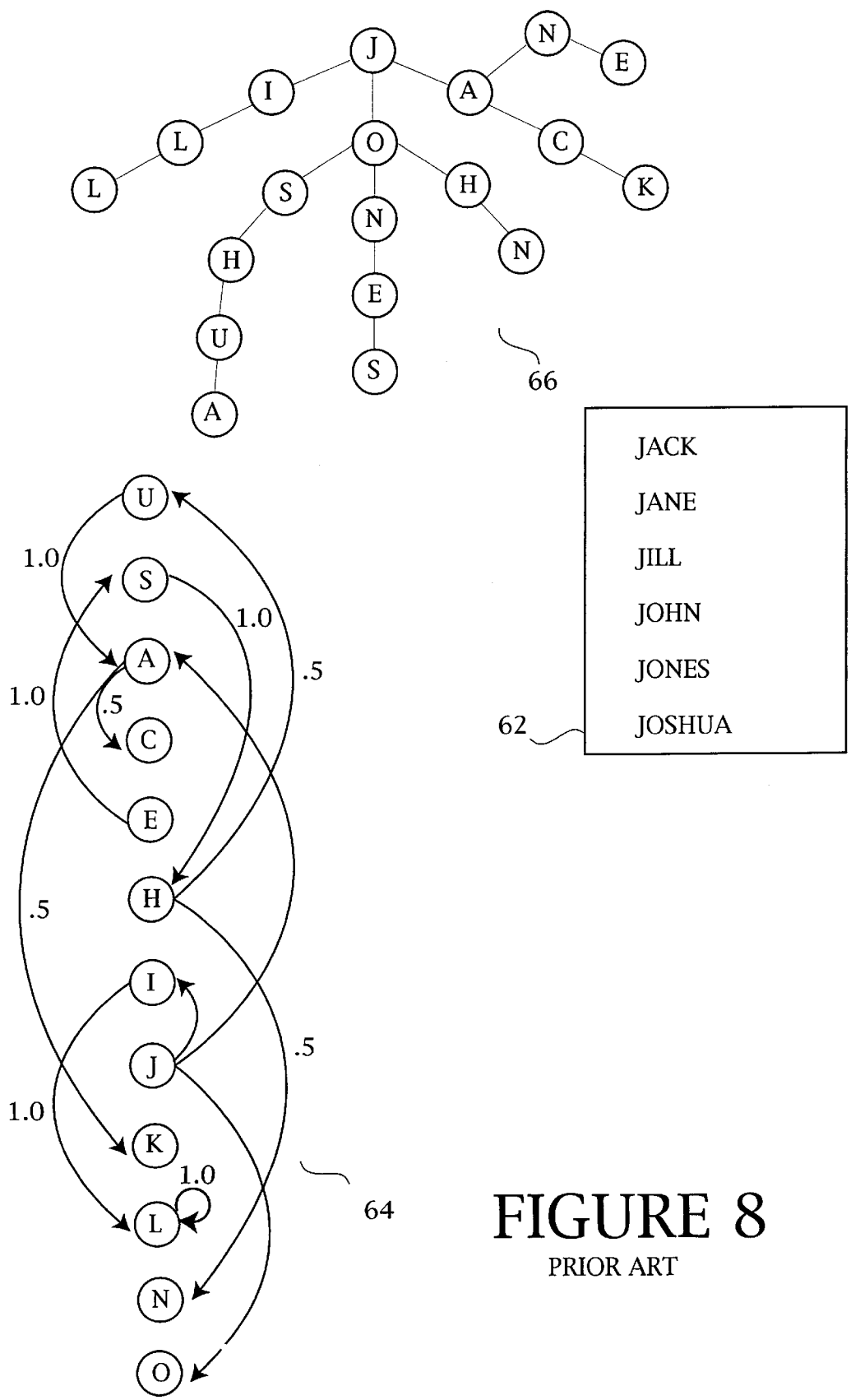
FIG. 8 illustrates tree-structured and bigram networks trained on the same dictionary of six names as illustrated in FIG. 7, wherein the data structures are conventionally based upon letters of the alphabet.

In comparing size between the respective bigram data structures 60 and 64 of FIGS. 7 and 8, keep in mind that the example includes only six spelled names. In particular, the full set of 26 letters is not required to spell those six names.

Thus data structure 64 (FIG. 8) contains 12 nodes instead of 26 and fewer transitions as well. On the other hand, data structure 60 contains only six nodes. In the general case, where the dictionary is large and utilizes all 26 letters, the data structure 64 of FIG. 8 would require 26 nodes, whereas the data structure 60 of FIG. 7 still only requires six nodes. This reduction in data structure size carries with it a corresponding reduction in the computational burden needed to process it.

Referring back to FIG. 2, the present invention incorporates knowledge of recognizer-dependent confusability into the lexicon level, fundamentally altering the manner in which phonetic units are defined. In contrast, conventional systems would place knowledge of confusable letters into the syntax level, leaving the lexicon level conventionally using letters of the alphabet as the phonetic units of the spelled name recognizer.

Example of Bigram Implementation Using Confusable Classes

To test the effectiveness of the invention, we built a bigram language model based on the confusable sets described above. For comparison, we also built a bigram language model based on a 28 state letter model. Both language models were trained on the Panasonic Speech Technology Laboratory (STL) database comprising 19 multi-accent speakers with 150 sentences per speaker choosing among a corpus of approximately 30,000 names. Tables I and II show the results achieved by the inventive class bigram and by the conventional letter bigram, respectively. Note that the class bigram has seven states and resulted in 167 transitions, whereas the letter bigram has 28 states and resulted in 631 transitions (not all contexts were present in our dictionary). As Tables I and II show, the average string recognition rate for the class bigram was reduced about 2.5%, on average, from recognition rates achieved by the conventional letter bigram. However, for certain individual speakers, the results with the class bigram were actually better than those achieved with the letter bigram. The class bigram also provided significantly faster decoding, on the order of two to three times faster than the conventional letter bigram, while requiring half the memory size.

In the tables that follow, the following abbreviations have been used: srr—string accuracy; ua—unit accuracy; sub—substitution; ins—insertion; del—deletion; csrr—class string recognition accuracy.

TABLE I

Class bigrams performance

| | | | | | |
|---|---|---|---|---|---|
| SPEAKER 1 | (japanese): | srr = 44.7, ua = 88.6, | sub = 127, | ins = 1, | del = 0 |
| SPEAKER 2 | (american (f) ): | srr = 36.7, ua = 86.9, | sub = 60, | ins = 3, | del = 83 |
| SPEAKER 3 | (french): | srr = 60.7, ua = 93.6, | sub = 68, | ins = 0, | del = 0 |
| SPEAKER 4 | (japanese (f) ): | srr = 32.7, ua = 86.4, | sub = 107, | ins = 20, | del = 22 |
| SPEAKER 5 | (american): | srr = 45.3, ua = 87.4, | sub = 0, | ins = 0, | del = 84 |
| SPEAKER 6 | (japanese (f) ): | srr = 52.0, ua = 91.0, | sub = 87, | ins = 8, | del = 3 |
| SPEAKER 7 | (italian): | srr = 29.3, ua = 87.4, | sub = 142, | ins = 0, | del = 1 |
| SPEAKER 8 | (canadian): | srr = 88.0, ua = 98.2, | sub = 15, | ins = 0, | del = 5 |
| SPEAKER 9 | (turkish): | srr = 62.0, ua = 93.0, | sub = 23, | ins = 16, | del = 35 |
| SPEAKER 10 | (american): | srr = 6.7, ua = 61.8, | sub = 121, | ins = 5, | del = 300 |
| SPEAKER 11 | (french): | srr = 33.3, ua = 85.3, | sub = 150, | ins = 0, | del = 16 |
| SPEAKER 12 | (french): | srr = 66.0, ua = 93.9, | sub = 57, | ins = 5, | del = 1 |
| SPEAKER 13 | (american): | srr = 91.3, ua = 98.6, | sub = 7, | ins = 2, | del = 6 |
| SPEAKER 14 | (indian): | srr = 95.3, ua = 99.3, | sub = 2, | ins = 5, | del = 0 |
| SPEAKER 15 | (canadian): | srr = 74.7, ua = 95.7, | sub = 36, | ins = 3, | del = 8 |
| SPEAKER 16 | (american): | srr = 63.3, ua = 93.2, | sub = 45, | ins = 1, | del = 27 |
| SPEAKER 17 | (american): | srr = 98.7, ua = 99.8, | sub = 2, | ins = 0, | del = 0 |
| SPEAKER 18 | (american): | srr = 87.4, ua = 97.5, | sub = 13, | ins = 8, | del = 5 |
| SPEAKER 19 | (chinese): | srr = 34.0, ua = 86.8, | sub = 138, | ins = 14, | del = 4 |
| TOTAL | | : srr = 57.9, ua = 90.6, | sub = 1250, | ins = 91, | del = .600 |

TABLE II

Letter bigram performance

| | | | | | |
|---|---|---|---|---|---|
| SPEAKER 1 | (japanese): | srr = 42.0, ua = 65.1, | sub = 387, | ins = 2, | del = 1 |
| SPEAKER 2 | (american (f) ): | srr = 44.6, ua = 71.6, | sub = 248, | ins = 2, | del = 67 |
| SPEAKER 3 | (french): | srr = 68.0, ua = 73.2, | sub = 284, | ins = 0, | del = 0 |
| SPEAKER 4 | (japanese (f) ): | srr = 36.6, ua = 71.3, | sub = 272, | ins = 20, | del = 23 |
| SPEAKER 5 | (american): | srr = 46.6, ua = 78.9, | sub = 156, | ins = 1, | del = 67 |
| SPEAKER 6 | (japanese (f) ): | srr = 50.0, ua = 76.8, | sub = 239, | ins = 9, | del = 3 |
| SPEAKER 7 | (italian): | srr = 30.6, ua = 69.0, | sub = 351, | ins = 0, | del = 1 |
| SPEAKER 8 | (canadian): | srr = 86.6, ua = 85.7, | sub = 150, | ins = 0, | del = 7 |
| SPEAKER 9 | (turkish): | srr = 62.6, ua = 80.7, | sub = 154, | ins = 18, | del = 31 |
| SPEAKER 10 | (american): | srr = 8.6, ua = 48.1, | sub = 295, | ins = 5, | del = 278 |
| SPEAKER 11 | (french): | srr = 44.6, ua = 67.2, | sub = 355, | ins = 1, | del = 16 |
| SPEAKER 12 | (french): | srr = 66.0, ua = 73.4, | sub = 268, | ins = 7, | del = 0 |
| SPEAKER 13 | (american): | srr = 90.6, ua = 83.5, | sub = 164, | ins = 3, | del = 4 |
| SPEAKER 14 | (indian): | srr = 93.3, ua = 83.9, | sub = 158, | ins = 9, | del = 0 |
| SPEAKER 15 | (canadian): | srr = 76.0, ua = 87.2, | sub = 126, | ins = 7, | del = 8 |
| SPEAKER 16 | (american): | srr = 69.3, ua = 80.9, | sub = 187, | ins = 1, | del = 17 |
| SPEAKER 17 | (american): | srr = 98.0, ua = 88.3, | sub = 125, | ins = 1, | del = 0 |

TABLE II-continued

Letter bigram performance

| | | | | | |
|---|---|---|---|---|---|
| SPEAKER 18 | (american): | srr = 86.0, ua = 84.3, | sub = 151, | ins = 8, | del = 4 |
| SPEAKER 19 | (chinese): | srr = 47.3, ua = 79.0, | sub = 225, | ins = 21, | del = 2 |
| TOTAL | | : srr = 60.4, ua = 76.1, | sub = 4295, | ins = 115, | del = 529 |

Tables I and II, above, compare the recognition rate achieved by the invention (Table I) with that of the conventional letter bigram (Table II). These tables demonstrate that the invention may be incorporated with very little negative impact upon recognition rate, notwithstanding the significant reduction in dictionary size and the attendant significant increase in decoding speed.

To assess the string recognition performance we supplied the output of both the class bigram recognizer and the letter bigram recognizer to a spelling checker. The spelling checker provides a quick way of assessing the quality of the recognition, by identifying output data generated by the recognizer that do not correspond to properly spelled words. The results for the inventive class bigram recognizer and for the conventional letter bigram recognizer are shown below in Tables III and IV, respectively. The results show that the class bigram of the invention provides better results than the conventional letter bigram.

In the tables that follow, the designation top1 identifies the score for the top candidate; top2 designates the score for the first and second top candidates; and top3 designates the score for the top first, second and third candidates.

TABLE III

Class-bigram performance

| | | | | |
|---|---|---|---|---|
| (1) | signals: 150 | top1 74.7 | top2 90.0 | top3 90.0 |
| (2) | signals: 150 | top1 46.0 | top2 49.3 | top3 49.3 |
| (3) | signals: 150 | top1 79.3 | top2 86.7 | top3 86.7 |
| (4) | signals: 150 | top1 56.7 | top2 66.0 | top3 66.0 |
| (5) | signals: 150 | top1 52.0 | top2 54.7 | top3 54.7 |
| (6) | signals: 150 | top1 76.7 | top2 82.7 | top3 82.7 |
| (7) | signals: 150 | top1 75.3 | top2 88.7 | top3 88.7 |
| (8) | signals: 150 | top1 88.7 | top2 93.3 | top3 93.3 |
| (9) | signals: 150 | top1 63.3 | top2 66.7 | top3 66.7 |
| (10) | signals: 150 | top1 8.0 | top2 9.3 | top3 9.3 |
| (11) | signals: 150 | top1 63.3 | top2 72.7 | top3 72.7 |
| (12) | signals: 150 | top1 86.7 | top2 91.3 | top3 91.3 |
| (13) | signas: 150 | top1 92.0 | top2 93.3 | top3 93.3 |
| (14) | signals: 150 | top1 92.7 | top2 94.7 | top3 94.7 |
| (15) | signals: 150 | top1 84.7 | top2 90.7 | top3 90.7 |
| (16) | signals: 150 | top1 76.7 | top2 80.0 | top3 80.0 |
| (17) | signals: 150 | top1 94.7 | top2 98.0 | top3 98.0 |
| (18) | signals: 150 | top1 82.0 | top2 86.7 | top3 86.7 |
| (19) | signals: 150 | top1 78.7 | top2 81.3 | top3 81.3 |
| TOTAL | : | top1 72.2 | top2 77.6 | top3 77.6 |

TABLE IV

Letter bigram performance

| | | | | |
|---|---|---|---|---|
| (1) | signals: 150 | top1 76.0 | top2 88.0 | top3 91.3 |
| (2) | signals: 150 | top1 43.3 | top2 49.3 | top3 50.7 |
| (3) | signals: 150 | top1 78.7 | top2 84.7 | top3 90.0 |
| (4) | signals: 150 | top1 56.7 | top2 63.3 | top3 64.7 |
| (5) | signals: 150 | top1 54.7 | top2 57.3 | top3 58.7 |
| (6) | signals: 149 | top1 70.5 | top2 79.2 | top3 81.2 |
| (7) | signals: 150 | top1 74.7 | top2 86.7 | top3 88.7 |
| (8) | signals: 150 | top1 89.3 | top2 90.7 | top3 91.3 |
| (9) | signals: 150 | top1 52.7 | top2 56.0 | top3 56.7 |
| (10) | signals: 150 | top1 12.0 | top2 12.7 | top3 12.7 |

TABLE IV-continued

Letter bigram performance

| | | | | |
|---|---|---|---|---|
| (11) | signals: 149 | top1 63.1 | top2 70.5 | top3 75.8 |
| (12) | signals: 150 | top1 82.0 | top2 92.0 | top3 92.7 |
| (13) | signals: 150 | top1 90.0 | top2 92.7 | top3 93.3 |
| (14) | signals: 150 | top1 79.3 | top2 92.7 | top3 92.7 |
| (15) | signals: 150 | top1 80.0 | top2 84.0 | top3 84.0 |
| (16) | signals: 150 | top1 96.0 | top2 80.7 | top3 83.3 |
| (17) | signals: 149 | top1 94.7 | top2 98.0 | top3 98.0 |
| (18) | signals: 149 | top1 83.9 | top2 88.6 | top3 89.9 |
| (19) | signals: 149 | top1 68.5 | top2 74.5 | top3 75.2 |
| TOTAL | : | top1 70.7 | top2 75.8 | top3 77.3 |

In the above data the results of applying a spelling checker are listed for all 19 speakers. The data shows how many sentences were involved per speaker (typically 150) and lists the performance scores for the top first, second and third best recognizer decisions. One interesting point to note is that with the class bigram (Table III) there is no difference in score between the top second and top third categories. This demonstrates that the class bigram converges quite quickly, allowing a system based on the class bigram to employ merely two prompt strings in a dialog system that interacts with the user. Thus a dialog system may be used to prompt the user to spell a name and to then confirm whether the retrieved name is correct. If the name is not correct, the system will supply the user with the second-most top candidate, again requesting the user to confirm whether the second candidate is the correct one. Because the scores for the second and third categories converge, it is not necessary to prompt the user after the second prompt.

To place the results of Tables III and IV into context, Table V shows the spelling checker results obtained by a system based on a tree structure, such as that shown at 66 in FIG. 8. The results show that the more highly constrained tree structure gives an overall improvement of about 12% as compared with the bigram data structures of Tables III and IV. The tree structure is, however, not practical in most applications because of its size. For the current example, the tree structure requires 110,174 nodes and 220,346 transitions.

TABLE V

Tree performance

| | | | | |
|---|---|---|---|---|
| (1) | signals: 150 | top1 82.0 | top2 86.0 | top3 88.0 |
| (2) | signals: 150 | top1 80.7 | top2 82.0 | top3 82.7 |
| (3) | signals: 150 | top1 74.0 | top2 80.0 | top3 83.3 |
| (4) | signals: 150 | top1 82.0 | top2 85.3 | top3 86.0 |
| (5) | signals: 150 | top1 84.0 | top2 87.3 | top3 87.3 |
| (6) | signals: 149 | top1 75.8 | top2 79.9 | top3 79.9 |
| (7) | signals: 150 | top1 55.3 | top2 63.3 | top3 67.3 |
| (8) | signals: 150 | top1 93.3 | top2 97.3 | top3 97.3 |
| (9) | signals: 150 | top1 92.0 | top2 93.3 | top3 94.0 |
| (10) | signals: 150 | top1 44.7 | top2 46.0 | top3 46.7 |
| (11) | signals: 149 | top1 78.5 | top2 83.2 | top3 85.9 |
| (12) | signals: 150 | top1 76.7 | top2 82.7 | top3 82.7 |

TABLE V-continued

Tree performance

| (13) | signals: 150 | top1 96.0 | top2 97.3 | top3 97.3 |
|---|---|---|---|---|
| (14) | signals: 150 | top1 94.0 | top2 95.3 | top3 95.3 |
| (15) | signals: 150 | top1 93.3 | top2 97.3 | top3 98.0 |
| (16) | signals: 150 | top1 93.3 | top2 96.0 | top3 97.3 |
| (17) | signals: 149 | top1 98.0 | top2 100.0 | top3 100.0 |
| (18) | signals: 150 | top1 93.3 | top2 96.0 | top3 96.0 |
| (19) | signals: 150 | top1 78.7 | top2 82.0 | top3 82.7 |
| TOTAL | : | top1 82.4 | top2 85.8 | top3 86.7 |

It is possible to use a skip-join grammar reduction technique to slightly compact the tree structure network while providing the same performance illustrated in Table V. The skip-join algorithm chooses network nodes to be merged without introducing new sentences to the lexicon. A "skip" condition occurs when a network node has one incoming transition and more than one exiting transition. A "join" occurs when a node has more than one incoming transition and only one exiting transition. The skip-join algorithm merges nodes by assuring that each skip node is placed before (i.e., closer to the root) of each join node. In this way no new sentences are added to the dictionary because the grammar will be a non-cyclic graph. Using a skip-join algorithm, the tree network of the preceding example was reduced to 60,927 nodes and 152,359 transitions, representing reductions of 44.7% and 30.9%, respectively.

Figure 9:
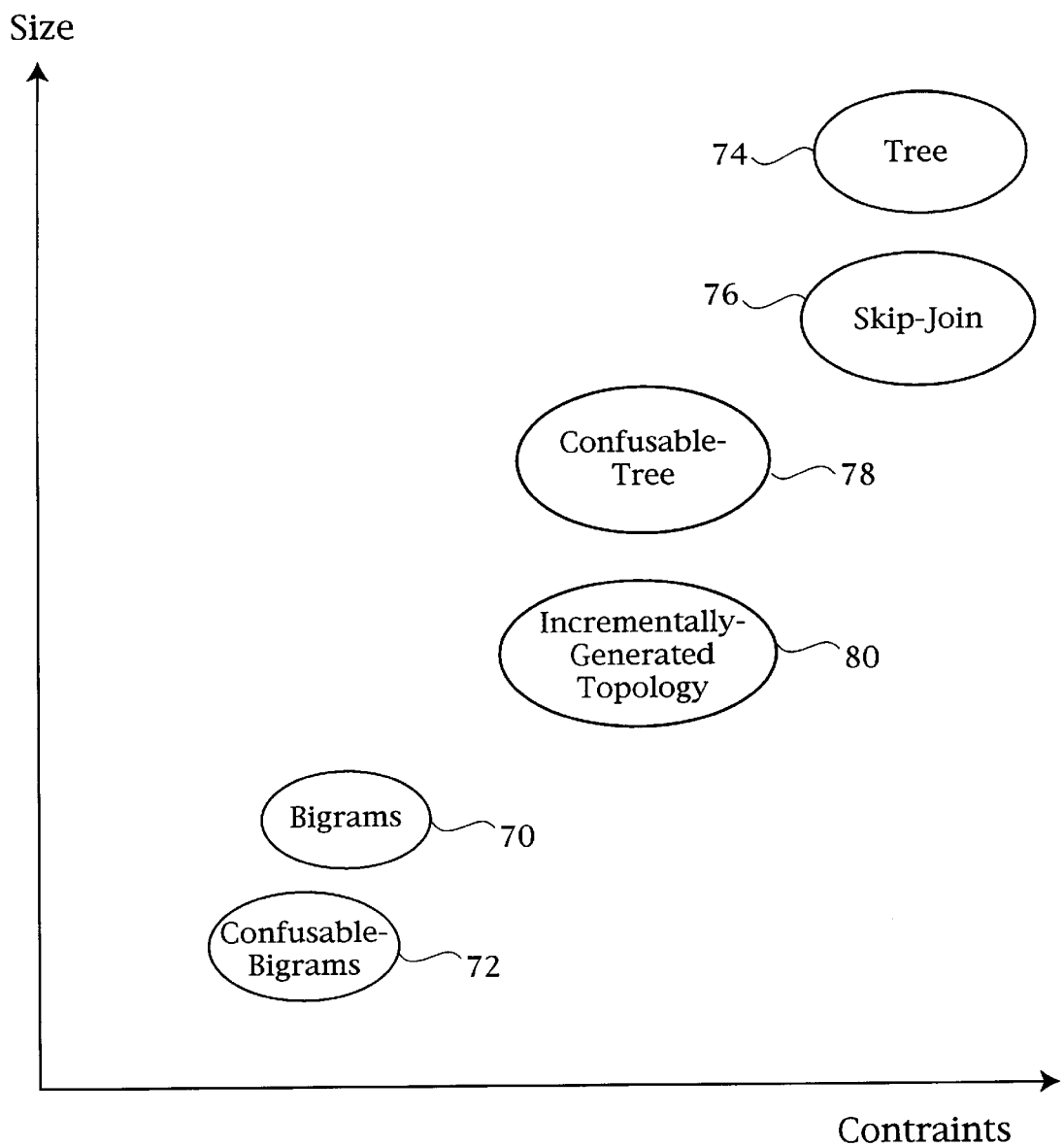
FIG. 9 is a graph comparing different data structures with respect to data structure size and the degree to which each structure constrains the pattern matching search space.

The example illustrates how confusable classes can reduce the size and complexity of the dictionary representation without adversely affecting the constraint imposed by the data structure. FIG. 9 shows this graphically. In FIG. 9 the conventional bigram is shown at 70, placed on the constraints—size plane at a location corresponding to a comparatively low constraint, small size. The class bigram based on confusable sets according to the invention occupies a position of smaller size, with approximately the same degree of constraint, as indicated at 72. By comparison, the tree structure, shown at 74, occupies a high constraint, large size position. When reduced using a skip-join algorithm the tree structure is slightly reduced in size while retaining the same level of constraint, as shown at 76.

Although the preceding example and much of the preceding description has discussed the invention in the context of a bigram data structure, the principles of injecting confusability into the language model can be practiced using other types of data structures. For example, the confusable sets or confusable classes can be used to construct a tree data structure, resulting in a further reduction in size vis-a-vis the skip-join tree and with only somewhat degraded constraint. The relationship of such a tree is illustrated at 78. The confusable tree 78, although larger than a bigram, exhibits many of the desirable properties of the tree structure, including a comparatively high degree of constraint and the ability to determine when the end of a given string is reached. In this regard, recall that the bigram data structure has no inherent way of symbolizing when the end of string is reached.

For even further improvement using the principles of the invention, an incrementally generated topology may be used. The incrementally generated topology, shown at 80, provides roughly the same degree of constraint as the confusable tree, while further reducing the size to that approaching the bigram data structure.

Unlike the preceding network topologies that are architecturally fixed by system design, the incrementally generated topology is a network topology that is constructed based on actual working data.

Figure 10:
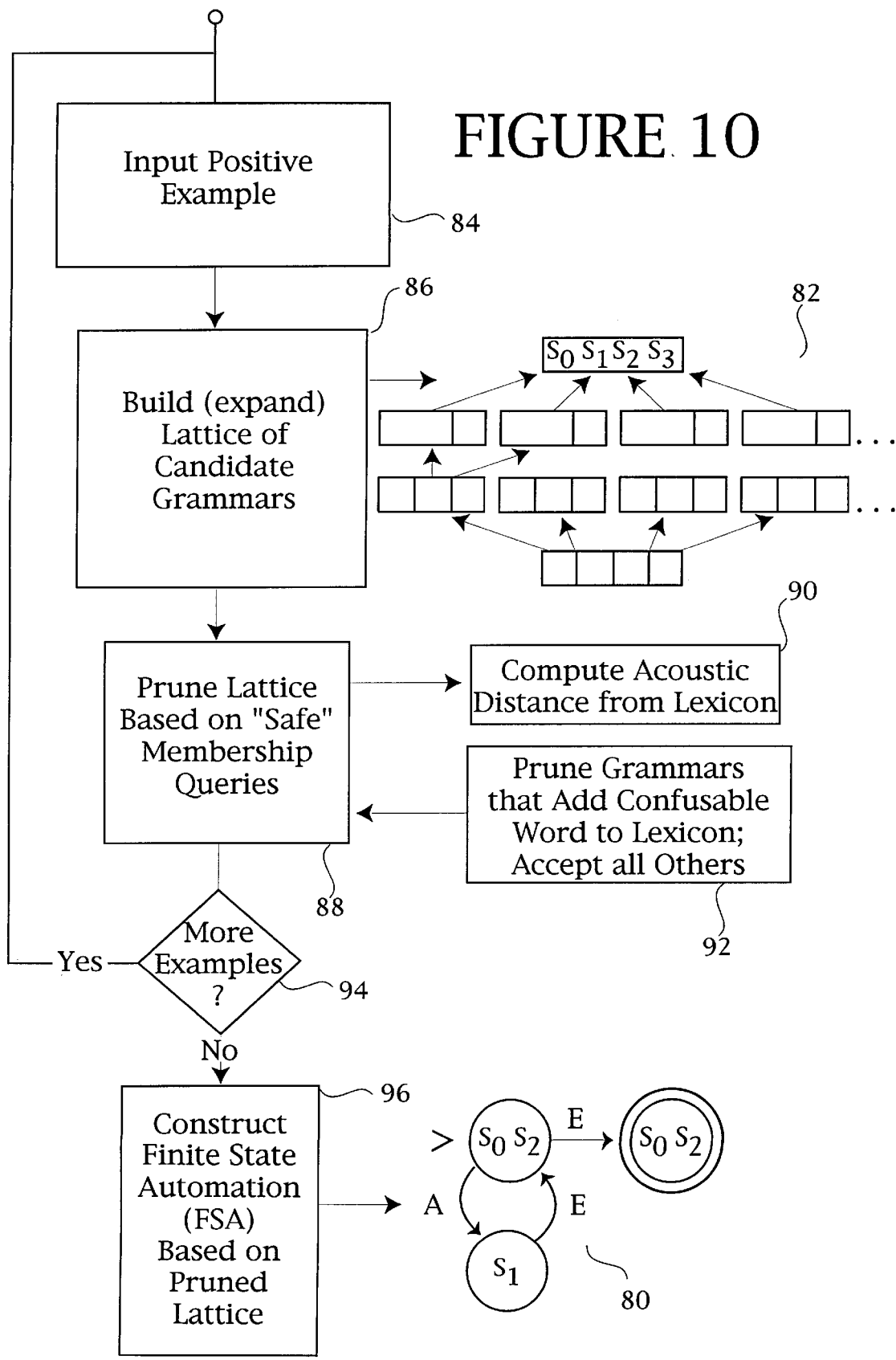
FIG. 10 is a flow-chart diagram illustrating a process for generating an incrementally, configured network in which nodes are selected based on acoustic distance from a predetermined lexicon.

A process for generating an incrementally configured network is illustrated in FIG. 10. Essentially, the technique seeks to identify a finite state automaton (FSA) to represent the grammar comprising all possible valid strings within the language. In the case of a spelled name recognizer, this grammar would generate all valid sequences of confusable classes that "spell" all names recognized by the system.

One process for generating incrementally configured FSA networks is shown in FIG. 10. The process incrementally constructs the FSA based on a plurality of input string examples during the training phase. The input string examples supplied during the training phase are known as positive examples, meaning that they are examples of sequences that spell entries actually found in the lexicon. Thus, in the spelled name recognizer example, these positive examples would represent sequence strings of confusable classes that correspond to names to be recognized by the system. The process incrementally generates a finite state automoton (FSA) 80, using an intermediate lattice data structure 82 (shown in greater detail in FIG. 11).

Figure 11:
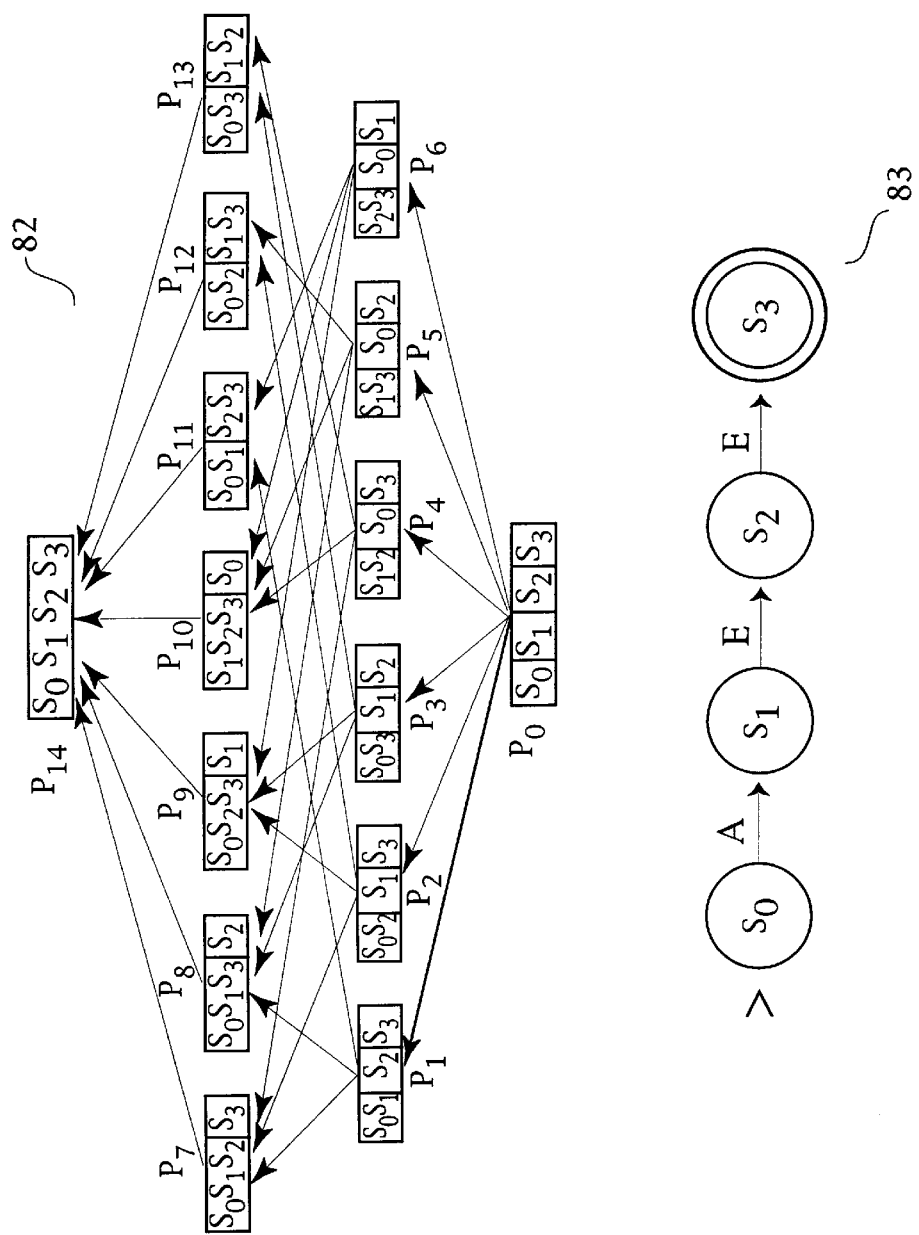
FIG. 11 is a lattice data structure diagram used by the process of FIG. 10.

The process inputs a positive example at Step 84 and proceeds to build or expand the lattice of candidate grammars at Step 86. Referring to FIG. 11, the lattice of candidate grammars 82 has been illustrated for the string AEE. FIG. 11 also shows at 83 the minimum state acceptor for the sequence AEE. This minimum state acceptor is known as the canonical automoton. It defines an initial state $S_0$ and three subsequent states $S_1$, $S_2$, and $S_3$, state $S_3$ being the terminal state. The lattice 82 represents all candidate grammars or the initial hypothesis space that is guaranteed to contain the unknown grammar that will generate the input string. In this case, the lattice is based originally on the first-supplied positive example from Step 84. As will be explained below, the algorithm prunes the lattice based on membership queries and then expands the lattice to add another positive example. In this way, the lattice expands and contracts until there are no more examples in the training set. The finally pruned lattice is then used to generate the final FSA.

The lattice 82 (FIG. 11) comprises a plurality of elements, designated $P_0 \ldots P_{14}$. These elements represent partitions of the input string, with the most general lattice appearing at $P_0$ and the most specific lattice appearing at $P_{14}$, The lines connecting elements between adjacent levels represent cases in which each cell in a given partition at one level is contained in some cell of a partition in the level above.

Referring back to FIG. 10, after the lattice has been constructed the process then prunes the lattice at Step 88 based on performing a membership query. Because the process is an incremental one, it cannot be assumed that the lattice constructed in Step 86 represents the complete set of all positive examples of strings recognized by the system. Indeed, during the first pass the lattice is based entirely upon only one positive example. The pruning operation is therefore performed by eliminating candidates through a "safe" membership query. Safe membership queries are determined based on the length of the string provided at Step 84. The input strings are preferably sorted in increasing order by length. Input strings that are longer than the length of the longest positive example represented by the lattice are treated as potentially unsafe for candidate elimination and they are therefore simply ignored by the pruning Step 88.

In accordance with one aspect of the present invention, the pruning operation is performed by computing the acoustic distance between the input string and the lexicon in Step 90 and by then pruning only those grammars that add confusable words to the lexicon in Step 92. All grammars that do not add confusable words to the lexicon are retained in the lattice.

The procedure described above continues through successive loops until there are no more examples to be supplied from the training data as determined at Step 94. Once the training data set has been exhausted, a finite state automaton (FSA) is constructed at Step 96 based on the pruned lattice generated by the preceding steps. The FSA, an example of which is illustrated at 80 for the string AEE, thus represents a network that will generate the set of strings in accordance with the lexicon. More specifically, the network nodes are selected based on acoustic distance from the predetermined lexicon and therefore represent a grammar that is tuned to handle confusability in a robust fashion.

The incrementally configured network would occupy a location in the graph of FIG. 10 that retains a high degree of constraint, but that is smaller than the skip-join tree structure, as illustrated at 80.

The preceding process for generating an incrementally configured network is one example according to the presently preferred embodiment. Other techniques for generating incrementally configured networks may be found in the literature. In this regard, reference may be had to a high degree of constraint, but that is smaller than the skip-join tree structure, as illustrated at 80.

The preceding process for generating an incrementally configured network is one example according the presently preferred embodiment. Other techniques for generating incrementally configured networks may be found in the literature. In this regard, reference may be had to:

[1] Rajesh Parekh and Vasant Honavar, "An incremental interactive algorithm for regular grammar inference", *Proceedings of the Third International Colloquium on Grammatical Inference IICGI'96*), Montpellier, France. Sep. 24–27, 1996. *Lecture Notes in Computer Science* vol. 1147 pp. 238–250.

[2] Parekh, R. G., Nichitiu, C., and Honavar, V. G., "A Polynomial Time Incremental Algorithm for Regular Grammar Inference", *Technical Report* 97–03, Department of Computer Science, Iowa State University.

These references describe various incremental techniques for inferring a regular grammar. These techniques can be modified, as described above, such that the membership queries are performed by computing acoustic distance from the lexicon and by then pruning the grammars that add confusable words to the lexicon in accordance with the principles of the present invention.

While the invention has been described in its presently preferred form, it will be understood that the invention is capable of certain modification without departing from the spirit of the invention as set forth in the appended claims.

What is claimed is:

1. A speech recognition system for analyzing input speech corresponding to a predefined set of syntactically defined content comprising:

a speech recognizer that performs a recognition process on input speech by considering a plurality of acoustic pattern matching sequences; and a language model associated with said recognizer for constraining the number of sequences considered by the recognizer during said recognition process;

wherein said language model is based on knowledge of said predefined set of syntactically defined content and includes a data structure that organizes said syntactically defined content according to acoustic confusability;

wherein said predefined set of syntactically defined content is a set of sound units comprised of a collection of sub-units and wherein said data structure defines a plurality of confusable sets to which said sub-units are assigned.

2. The system of claim 1 wherein said acoustic confusability is established based on recognition performance of said speech recognizer.

3. The system of claim 1 wherein said data structure is a bigram data structure.

4. The system of claim 1 wherein said data structure is an N-gram data structure, where N is an integer greater than one.

5. The system of claim 1 wherein said data structure is a tree data structure.

6. The system of claim 1 wherein said data structure is an incrementally configured network having nodes selected based on acoustic distance from a predetermined lexicon.

7. The recognition system of claim 1 wherein the confusable sets are defined by sub-units that the recognizer finds confusable.

8. The recognition system of claim 1 wherein the sound units include spelled words and the sub-units include individual letters, the confusable sets including at least one of the following sets and consisting essentially of the following letters:

A-Set: a, h, j, k

E-Set: b, c, d, e, g, p, t, v, z

F-Set: f, s, x

I-Set: i, y, r

M-Set: l, m, n, o

U-Set: u, q, w.

9. The recognition system of claim 1 wherein the sound units include phonetic transcriptions of words and the sub-units include individual phonemes.

10. A method for analyzing input speech with a speech recognizer of the type that performs a recognition process on input speech by considering a plurality of acoustic pattern matching sequence, comprising the steps of:

constructing an individual language model bas ed on confusable classes; and using said language model to constrain the number of sequences considered by said speech recognizer during the recognition process;

wherein said language model is based on knowledge of a predefined set of syntactically defined content and includes a data structure that organizes said syntactically defined content according to acoustic confusability;

wherein said predefined set of syntactically defined content is a set of spelled words or names comprised of collection of individual letters and wherein said data structure defines a plurality of confusable classes to which said individual letters are assigned, wherein said confusable sets include at least one of the following sets and consisting essentially of the following letters:

A-Set: a, h, j, k

E-Set: b, c, d, e, g, p, t, v, z

F-Set: f, s, x

I-Set: I, y, r

M-Set: l, m, n, o

U-Set: u, q, w.

11. The method of claim 2 wherein said step of constructing a language model is performed by grouping syntactically defined content according to acoustic confusability.

12. The method of claim 11 wherein acoustic confusability is established based on recognition performance of said speech recognizer.

13. The method of claim 10 further comprising organizing said language model into a bigram data structure.

14. The method of claim 10 further comprising organizing said language model into an N-gram data structure, where N is an integer greater than one.

15. The method of claim 10 further comprising organizing said language model into a tree data structure.

16. The method of claim 10 wherein the step of constructing a language model is performed by constructing an incrementally configured network having nodes selected based on acoustic distance from a predetermined lexicon.

* * * * *